(12) United States Patent
Dyck et al.

(10) Patent No.: US 12,006,903 B2
(45) Date of Patent: Jun. 11, 2024

(54) METHODS AND SYSTEMS FOR REDUCING ENGINE IDLING OF FUEL-DRIVEN EQUIPMENT

(71) Applicant: TY-CROP MANUFACTURING LTD., Rosedale (CA)

(72) Inventors: Joshua L. Dyck, Calgary (CA); Rick Jonker, Chilliwack (CA); William Walter Johnston, Cultus Lake (CA)

(73) Assignee: TY-CROP MANUFACTURING LTD., Rosedale (CA)

( * ) Notice: Subject to any disclaimer, the term of this patent is extended or adjusted under 35 U.S.C. 154(b) by 0 days.

(21) Appl. No.: 17/243,921

(22) Filed: Apr. 29, 2021

(65) Prior Publication Data
US 2021/0381480 A1 Dec. 9, 2021

Related U.S. Application Data

(60) Provisional application No. 63/035,997, filed on Jun. 8, 2020.

(51) Int. Cl.
*F02N 11/08* (2006.01)
*F16H 57/04* (2010.01)

(52) U.S. Cl.
CPC ...... *F02N 11/0862* (2013.01); *F02N 11/0829* (2013.01); *F16H 57/0412* (2013.01); *F02N 2200/022* (2013.01); *F02N 2200/023* (2013.01); *F02N 2200/025* (2013.01); *F02N 2200/063* (2013.01); *F02N 2200/0802* (2013.01)

(58) Field of Classification Search
CPC .. F02N 11/08; F02N 11/0829; F02N 11/0862; F02N 2200/022; F02N 2200/023; F02N 2200/025; F02N 2200/063; F02N 2200/0802; F16H 57/04; F16H 57/0412
See application file for complete search history.

(56) References Cited

U.S. PATENT DOCUMENTS

| | | | |
|---|---|---|---|
| 6,532,926 B1 | 3/2003 | Kuroda et al. | |
| 6,595,180 B2 | 7/2003 | Thompson et al. | |
| 6,817,329 B2 | 11/2004 | Buglione et al. | |
| 6,935,114 B2 | 8/2005 | Hajek et al. | |
| 7,146,959 B2 | 12/2006 | Thompson et al. | |
| 8,655,574 B2 * | 2/2014 | Izumoto | F02N 11/0866 701/112 |
| 9,701,312 B2 | 7/2017 | Jensen et al. | |
| 10,358,989 B2 | 7/2019 | Uriona et al. | |
| 10,371,113 B2 | 8/2019 | Sepulveda et al. | |

(Continued)

FOREIGN PATENT DOCUMENTS

EP 2537989 A1 12/2012

*Primary Examiner* — John Kwon
*Assistant Examiner* — Johnny H Hoang
(74) *Attorney, Agent, or Firm* — Burns & Levinson, LLP; Joseph M. Maraia

(57) ABSTRACT

Methods, apparatus and systems for reducing engine idling of fuel-driven equipment, for example found on a wellsite and/or including hydraulic pumping systems are provided. In particular, systems and methods are provided for controlling the starting and shutdown of equipment powered by a fuel-driven engine, the system comprising of an energy accumulator comprising or consisting of one or more supercapacitors. The transmission, transmission fluid, or other components can be warmed to prolong time between engine restarts.

16 Claims, 4 Drawing Sheets

(56) References Cited

U.S. PATENT DOCUMENTS

| | | | |
|---|---|---|---|
| 2002/0096137 A1* | 7/2002 | Kobayashi | B60L 50/16 |
| | | | 123/179.4 |
| 2010/0304926 A1* | 12/2010 | Soliman | B60W 30/18054 |
| | | | 477/38 |
| 2011/0155714 A1* | 6/2011 | Thomas | F16H 57/0413 |
| | | | 219/205 |
| 2013/0160440 A1 | 6/2013 | Ault | |
| 2014/0081561 A1* | 3/2014 | Be | F02N 11/0818 |
| | | | 701/112 |
| 2014/0166596 A1* | 6/2014 | Anderson | F02M 37/28 |
| | | | 210/744 |
| 2015/0148191 A1* | 5/2015 | Shepherd | B60K 6/48 |
| | | | 477/183 |
| 2015/0159613 A1* | 6/2015 | Jensen | B60W 10/06 |
| | | | 701/68 |
| 2015/0252770 A1* | 9/2015 | Books | B60W 30/192 |
| | | | 701/22 |
| 2016/0359328 A1* | 12/2016 | Hunt | H02J 7/022 |
| 2016/0369733 A1* | 12/2016 | Dokras | F02D 41/28 |
| 2018/0187604 A1* | 7/2018 | Poumarede | F02C 9/42 |
| 2019/0128230 A1* | 5/2019 | Ihde | H02J 7/34 |
| 2019/0249638 A1* | 8/2019 | Miller | B60L 50/61 |
| 2019/0329346 A1* | 10/2019 | Radtke | B23K 9/0953 |
| 2020/0331455 A1* | 10/2020 | Meyer | B60K 6/52 |
| 2020/0369259 A1* | 11/2020 | Huq | B60W 20/13 |

* cited by examiner

METHODS AND SYSTEMS FOR REDUCING ENGINE IDLING OF FUEL-DRIVEN EQUIPMENT

CROSS-REFERENCE TO RELATED APPLICATIONS

This patent application claims the benefit of U.S. Provisional Patent Application No. 63/035,997, filed Jun. 8, 2020, which is incorporated by reference herein in its entirety.

FIELD OF THE INVENTION

The present invention pertains to control of fuel-driven equipment in general and in particular to methods and systems for reducing engine idling of fuel-driven equipment, such as but not necessarily limited to equipment found on a wellsite, including hydraulic pumping systems.

BACKGROUND

Hydraulic fracturing operations typically require a number of engines powering pumps to achieve the down-hole pressure required to fracture a formation. These engines may spend a large portion of their time idling while at a wellsite. This idle time can occur for a variety of reasons, but is often associated with switching wells or advancing to another stage within a well.

These engines are generally large, high horsepower (1000-5000 HP) units, which consume significant amounts of fuel and contribute significant amounts of noise and exhaust even while idling. It is not practical to have one or more people on standby to manually shut down and restart the engines when needed to reduce idle time. Thus, an automatic system for detecting idle time and shutting down engines, and also respond to start-up requests and restart the engines, is valuable.

In order to restart a large engine, a significant amount of energy is required. This can be provided by an attached tractor or other piece of nearby equipment. Such tractor or other equipment may have a hydraulic wet kit installed, allowing it to turn hydraulic starters on the engine. This however does not address the idling issue, but rather moves the idling issue to the tractor or other piece of equipment, which idles when in standby waiting to restart an engine. As well, efforts are made to limit the amount of equipment on a wellsite to reduce the site footprint, and limit the amount of capital on a site that could be working elsewhere.

A more efficient method of restarting the engines involves capturing energy from the system when idling or in operation, accumulating it, and then releasing it when the engine needs to be restarted. Examples of such solutions include the use of hydraulic accumulators, which use a pump powered by the engine to store hydraulic fluid under pressure. The associated stored energy can later be released to power hydraulic starters. This method although effective is both costly and complex.

Another method uses batteries (e.g. lead-acid battery, Li-ion battery) to store electrical power from the alternator when the engine is running or idling, and uses the batteries to power electric starters. While this works, the power draw required from the batteries is large, and this draw and the resulting discharge state of the batteries can impact their life. Repeated deep and rapid discharges can thus occur, which can be problematic.

Further, devices should recognize appropriate times to initiate a shutdown or restart. Appropriate times can be determined by a number of criteria such as temperature of the engine and charge state of the accumulator. Requests to restart must be acted on as quickly as possible, as the demand for the pump to begin may be urgent. Cold starts should be minimized to reduce undue stress and wear.

Therefore there is a need for a cost-effective and sufficiently sophisticated method and system for reducing engine idling of fuel-driven equipment, such as but not necessarily limited to equipment found on a wellsite including hydraulic pumping systems, that is not subject to one or more limitations and issues described above.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide methods and systems for reducing engine idling associated with fuel-driven equipment, for example a hydraulic pumping system. Embodiments can be applied to equipment which is driven using fuel (e.g. combustible fuel) such as but not necessarily limited to gasoline, diesel fuel, bio-diesel, ethanol, or natural gas.

In accordance with an aspect of the invention, there is provided a method for reducing idle time of equipment powered by a fuel-driven engine. The method includes, while the engine is in operation or in idle, storing energy in an energy accumulator operatively associated with the engine and a starter. In various embodiments, the energy accumulator includes a supercapacitor. According to embodiments, the method also includes shutting down the engine when all predetermined engine stop conditions are met. The method further includes restarting engine with the starter using energy stored in the energy accumulator. The engine is restarted in response to an engine restart request or a system signal, when all engine restart conditions are met.

In some embodiments, the method further includes heating a transmission associated with the engine at least when the engine is shut down. The transmission may be heated by directly or indirectly heating a transmission fluid associated with the transmission. Similarly, in some embodiments, the method further includes heating one or more components associated with the engine at least when the engine is shut down. Said one or more components may be heated using energy from a heat source or energy source, which may include or be separate from the supercapacitor. In addition or alternatively, the one or more components may be heated by directly or indirectly heating one or more fluids used in operation of said one or more components. In some embodiments, the heat within the transmission and/or the heat within the one or more components may be preserved through use of insulation or covers.

In some embodiments, the method further includes pre-lubricating the engine prior to the restart of the engine. The engine may be pre-lubricated by circulating engine oil or other fluid. The engine pre-lubrication can provide oil pressure required for cranking.

In some embodiments, shutting down and restarting the engine are associated with one or more of the engine stop conditions and the engine restart conditions. The engine stop conditions and the engine restart conditions are associated with one or more parameters associated with one or more of: engine speed, engine temperature, auxiliary equipment temperature, transmission temperature, associated transmission state, engine coolant temperature, engine oil pressure, associated battery voltage and associated capacitor charge. The one or more parameters may be user-adjustable, fixed with predetermined values, or automatically adjusted by a system for reducing idle time of equipment.

In some embodiments, the method further includes determining that the engine is inactive when a predetermined idle period elapses and a transmission associated with the engine is in a non-driving state, for example a neutral, park or brake state. The predetermined idle period may be user-adjustable, fixed at a predetermined value, or automatically adjusted by a system for reducing idle time of equipment. Determining that the engine is inactive may be one of the above-mentioned engine stop conditions.

In some embodiments, the energy accumulator further includes one or more additional supercapacitors, electrostatic double-layer capacitors (EDLCs), electrochemical pseudo-capacitors, hybrid capacitors, batteries, or any combination thereof.

In various embodiments, the equipment powered by the fuel-driven engine is one of hydraulic pumping equipment, construction equipment, mining equipment, power generation equipment, and temporary or permanent installation equipment.

In accordance with embodiments of the present invention, there is provided a system for reducing idle time of equipment powered by a fuel-driven engine. The system includes a starter configured to restart the engine, and an engine controller configured to inactive and shut down the engine. The system also includes an energy accumulator. The energy accumulator includes a supercapacitor configured to store energy when the engine is in operation or in idle and provide the stored energy to the starter when the starter restarts the engine. The energy accumulator is operatively associated with the engine and the starter. The system further includes a control system for controlling shutdown and restart of the engine. The control system includes a processing unit configured to provide, to the starter or the engine controller, one or more instructions. The one or more instructions are associated with (i) shutting down the engine when all engine stop conditions are met, and (ii) restarting the engine with the starter in response to an engine restart request or a system signal, when all engine restart conditions are met. In some embodiments, the control system further comprises a user interface for adjusting one or more of parameters, set points, the engine stop conditions, the engine restart conditions, and system operations including activation and inactivation of the system. The parameters may be associated with the engine restart conditions, the engine stop conditions, or both. In some embodiments, the system further comprises one or more of a heater and an alternator.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
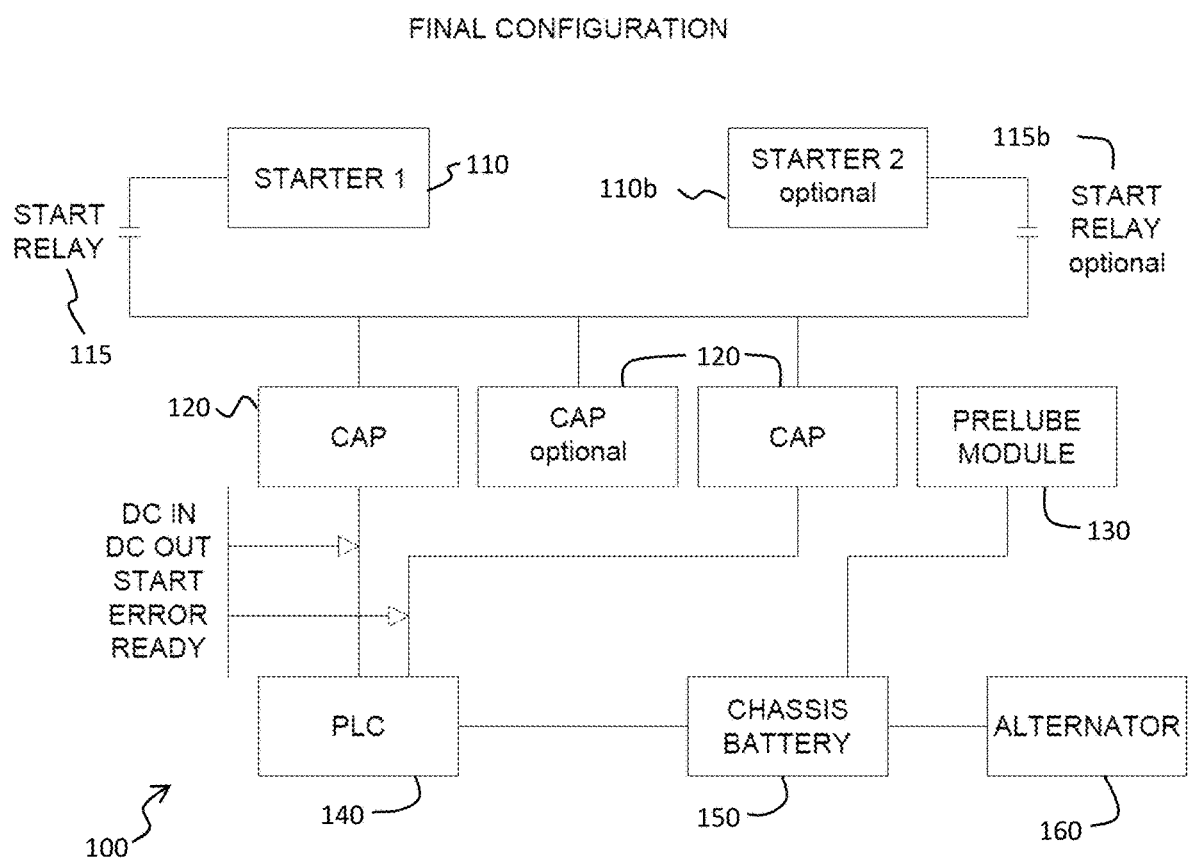
FIG. 1 illustrates a high-level electrical layout of the components of the idle reduction system, according to an embodiment of the present invention.

Embodiments of the present invention provide methods and systems for reducing idling of fuel-driven equipment (e.g. equipment powered by a fuel-driven engine). Embodiments of the present invention may be applied to control idling of a fuel-driven engine of a hydraulic pumping system (or a hydraulic pumping equipment). However, it should be understood that embodiments of the present invention may be more generally applied to other fuel-driven equipment, such as but not necessarily limited to construction equipment, mining equipment, power generation equipment, temporary or permanent installation equipment, etc.

A potential benefit of reducing idle time of equipment found on a wellsite or other site, in some embodiments, is that there is a reduction in fuel consumption, noise pollution and exhaust pollution. This benefit can, in part, be due to automatically shutting down idling engines.

Embodiments of the present invention further provide for engine restart using energy captured from the system. The energy may be energy which is stored in an energy accumulator which includes one or more supercapacitors. Engine restart includes restart upon request or automatically in response to system signals and may refer to the starting of the engine after a shutdown was automatically completed, manually completed, or the first start of the engine prior to any shutdown sequence. The system signal(s) may be the signal(s) generated by the engine idle reduction system (e.g. control system or other component) and may carry one or more instructions associated with the engine restart. The system signal may be an electrical signal.

A potential benefit in some embodiments is that restart of the engine is energy efficient. This benefit can in part be due to the capture and storing of energy from the engine by an energy accumulator. In particular, once the accumulator is charged, the engine does not have to remain idling. Furthermore, by using a supercapacitor, the charging can be performed quickly, thus potentially reducing time dedicated to accumulator charging only.

Embodiments of the present invention further provide for the automatic detection of appropriate times to transition from idling to shutdown, appropriate times to complete a shutdown, appropriate times to restart, and appropriate times to complete a restart.

Embodiments of the present invention provide a system for reducing idle time of equipment powered by a fuel-driven engine. The idle reduction system comprises a control system and a secondary starter system. The control system is configured to automatically control operation of the engine, such as engine shutdown and restart based on pre-set or user adjustable set points. Optionally, the secondary starter system is operable in manual mode to provide secondary starting capabilities. In some embodiments, the system comprises two or more starters.

In one such embodiment, the independent secondary starter system uses the existing trailer batteries to charge supercapacitors with an electrostatic charge; the discharge from these supercapacitors powers the electric starter and restarts the engine using the energy from the supercapacitors. It is considered that supercapacitors (including ultracapacitors and related technologies) are particularly well suited to energy storage in the present invention, for example due to their power density, high charge and discharge rate, efficiency, tolerance to different operating environments, predictability of failure, and lifetime in terms of number of charge/discharge cycles or calendar life.

The control system of the idle reduction system comprises a processing unit configured to determine if the engine should be shut down or re-started and provide instructions to the starter or other associated components including transmission control, engine control and pre-lube control. To determine if the engine should be shut down or restarted, the processing unit may be further configured to receive at least one operating parameter or data relating thereto of the fuel-driven engine and/or the equipment powered by the fuel-driven engine, compare it to predetermined idle reduction parameters or set points. In some embodiments, the value of the idle reduction parameters or set points may be determined by the control system or other component of the idle reduction system.

The control system may comprise or be operably linked to a user interface allowing for the adjustment of parameters (e.g. idle reduction parameters), set points, stop/start conditions, and system operations including activation/inactivation of the idle reduction system. The user interface may include inputs such as but not necessarily limited to buttons, switches, lever, dial, touchscreen, keyboard or voice activated equipment.

In some embodiments, the user interface is remotely accessible by transmitted signals. Accordingly, in some embodiments, the user interface is a remote control, a smart device application or a software program running on a computing device.

The control system may be configured to operate the idle reduction system in automatic mode, where the system automatically monitors engine activity to determine engine shutdown and restart. If the engine speed is below the set-point and the transmission is in a non-driving state, e.g. labelled neutral, park or brake, the system will look to shut down the engine after the delay timer elapses. If all engine stop conditions are met the status indicators (such as one or more indicator lights or strobe lights and/or horns) will activate and the engine shuts down.

In some embodiments, the system provides for heating of the transmission or other auxiliary equipment, excluding the engine. Accordingly, the control system optionally includes control means, such as a controllable heater, for heating the auxiliary equipment. In some embodiments the heating of the transmission or other auxiliary equipment may be completed by circulating warmed engine coolant or other fluid to them. The fluid can be a transmission fluid in the case of heating the transmission. The fluid can be heated in a variety of ways, for example by directly passing the fluid through a heater, or indirectly by heating another fluid and transferring the heat between fluids using a heat exchanger. In such embodiments, the control system may function to control various pumps. The auxiliary equipment may be heated using energy from a supercapacitor. For example, heaters used for heating the transmission or the auxiliary equipment can be powered by a supercapacitor which is charged by the engine when the engine is running.

In some embodiments, in addition to or alternatively to heating the transmission, auxiliary equipment such as hydraulics, miscellaneous enclosures, pump power ends, well service pump fluid systems, batteries, dual-fuel or blended fuel gas line systems, intake air systems, etc. may be heated. Heating can occur by circulating heated fluid through components or by direct (e.g. electrical) heating, for example. Heating of a fluid which is used by a system component during its operation (e.g. a lubricating fluid, a force-transmitting fluid, or another working fluid) has the advantage of being able to heat the system component beginning from its interior, without having to fit additional heaters directly to the system component. Instead the fluid can be heated remotely and circulated through the system component, e.g. using a pump or convection. Heating of appropriate components can be performed in order to facilitate restarting of systems which are otherwise adequately heated during active operation. This may reduce the system loading or other required processes during a restart of the engine.

In some embodiments, passive heat retention, such as insulation or other covering, is used to retain heat in components that may otherwise cool down quickly and require active heating or an engine restart.

In some embodiments, the control system is configured to receive engine temperature and storage state of the accumulator, and make shutdown and restart decisions based on these values.

In some embodiments, the control system is configured to receive the temperature of the transmission and makes shutdown and restart decisions based on this value.

In some embodiments, the control system is configured to receive an indication of the temperature of auxiliary equipment, in addition to or alternatively to indications of the engine and transmission temperatures, and makes shutdown and restart decisions based on these values. The indication of the auxiliary equipment may be an indication other than indications of the engine and the transmission.

In some embodiments, the engine idle reduction system includes a pre-lube system to circulate engine oil prior to a restart of the engine. Accordingly, the control system, in some embodiments, controls the pre-lube system.

In some embodiments, the control system is set such that the engine idle reduction system will not restart the engine automatically when one or more predetermined combinations of component temperatures and engine oil pressure are not met. In other words, the engine may be restarted only when the one or more predetermined combinations of the component temperatures and engine oil pressure are satisfied. In some embodiments, one or more other parameters associated with the restart of the engine may be automatically adjusted by the engine idle reduction system.

In some embodiments, the engine idle reduction system can be operated manually to force a restart of the engine. The restart of the engine may be manually controlled by the user using a user interface allowing start or stop of the engine regardless of whether any condition for automatic restart of the engine is met. The user interface may include inputs such as but not limited to buttons, switches, lever, dial, touchscreen, keyboard or voice activated equipment.

According to embodiments, one or more of the engine stop conditions and the engine restart conditions are associated with one or more parameters (e.g. shutdown and restart parameters). These parameters may be associated with one or more of engine speed, engine temperature, auxiliary equipment temperature, transmission temperature, associated transmission state, engine coolant temperature, engine oil pressure, associated battery voltage and associated capacitor charge.

In some embodiments, the engine idle reduction system shutdown and restart parameters are user adjustable. The user may control or adjust the engine idle reduction system shutdown and restart using a user interface allowing adjustment of parameters (e.g. shutdown and restart parameters), set points, stop/start conditions and system operations including activation/inactivation of the engine idle reduction system. The user interface may include inputs such as but not limited to buttons, switches, lever, dial, touchscreen, keyboard or voice activated equipment.

In some embodiments, the engine idle reduction system shutdown and restart parameters are determined by the system. For that, one or more parameters associated with the shutdown and restart of the engine may be automatically adjusted by the engine idle reduction system (e.g. control system or other component(s)).

In some embodiments, a delay timer initiates the shutdown after a certain amount of idle time has occurred. The amount of idle time before the shutdown may be set by the user using a user interface comprising inputs such as but not limited to buttons, switches, lever, dial, touchscreen, keyboard or voice activated equipment.

Example shutdown conditions (engine stop conditions) include but are not necessarily limited to one or a combination of:
  Engine speed below idle set point
  Transmission in non-driving state e.g. neutral/brake/park
  Battery voltage above minimum
  Coolant temperature above minimum
  Transmission temperature above minimum
  Capacitor charge above minimum
  Determining that the engine is in an inactive state
  Custom conditions may also be specified.

In various embodiments, when one or more engine restart conditions are met, the status indicators start, and the pre-lube cycle initiates. Subsequently, when minimum engine oil pressure is reached, the engine starts up.

Example restart conditions include but are not necessarily limited to one or a combination of:
  Battery voltage below minimum
  Coolant temperature below minimum
  Transmission temperature below minimum
  Capacitor charge below minimum
  Custom conditions may also be specified.

In one embodiment, system indicators are used to convey the status of the system and to warn those nearby of changing states. These indicators may include one or more of the followings:
  System Active—indicator light will slowly flash to indicate the system is on
  State Change (Start/Stop)—indicator lights fast flash and the horn sounds for customer set time period.

In one embodiment, some operations can be initiated manually, such as requesting the engine to restart or preventing the engine from shutting down by moving the gear selector from park/brake to neutral. The engine restart request or the engine shutdown prevention can be controlled using an alternative gear selector, for example paddle or electrical switch.

In one embodiment, a manual mode of operation allows for manual engine prelube and start, and manual energy charge and discharge functions. Each manual operation may be individually or collectively controlled by the user.

In one embodiment, the idle reduction system may be used to provide the initial start without any attached tractor.

In one embodiment, the idle reduction system may be installed in parallel with a preheat system to meet initial starting requirements in cold conditions.

In one embodiment, the idle reduction system may control some aspects of the heating system, such as directing warmed fluid to or circulating warmed fluid through various parts of the equipment.

Typically, the stop/start conditions may be adjusted to minimize or reduce idle time and restarts due to low charge or temperatures. This in turn is expected to maximize or increase fuel efficiency and component life.

In some embodiments, the idle reduction system defaults to being active. In alternative embodiments, the idle reduction system must be turned on or engaged by the operator.

Embodiments of the present invention provide for the capture and storage of energy from operating or idling engines. Captured energy is stored in one or more energy accumulator(s) (e.g. electrical accumulator). Energy accumulators include supercapacitors, otherwise known as ultracapacitors. In some embodiments, the energy accumulators include one or more supercapacitors in parallel with other types of energy accumulators. The other types of energy accumulators can include other capacitors such as electrostatic double-layer capacitors (EDLCs), electrochemical pseudo-capacitors, hybrid capacitors (e.g. Li-ion capacitor). The other types of energy accumulators can include lead-acid, Li-ion or other batteries. A combination of supercapacitors and batteries or other (electrical and/or non-electrical) energy storage devices can be used. The types, arrangement and specifications of the energy accumulators can be designed based on operating requirements of the equipment.

An operator can elect to either use or not use the idle reduction system. When the idle reduction system is not in use, a normal start sequence may be carried out. Optionally, prior to start, the engine can be pre-lubricated by running the pre-lube pump for a set amount of time. For example, the operator can request the pre-lube pump operate for 30 seconds to lubricate the engine before using a standard starter sequence. The time for the engine pre-lubrication can be determined manually by the user via some user interface or automatically by the system based on one or more predetermined conditions (e.g. temperature). In some embodiments, the pre-lubrication fluid may be warmed up to increase the temperature of the engine and/or other components (e.g. transmission) for example by circulating the warmed fluid through various parts of the system.

When the idle reduction system is engaged and the engine is running, in certain embodiments, the system will begin charging the energy accumulator that is operatively associated with at least one starter. Optionally, the system is configured to circulate warm fluid, such as oil, to adjust the temperature to a certain value before charging the energy accumulator (e.g. electrical accumulator) to ensure optimum starter performance. The temperature value can be determined manually by the user or automatically by the system based on one or more factors such as surrounding temperature or engine types. In some embodiments, the temperature value may be determined spontaneously when circulating the warm fluid.

The system is configured to both determine engine idle time (by the user or the system) and to inactivate the engine after a predetermined idle period (e.g. user-defined, system-calculated) at idle and the associated transmission is in a non-driving state (e.g. park). The predetermined idle period may be user-adjustable, fixed, or automatically adjusted by the system. Optionally, an alert for imminent engine inaction or shutdown is provided. A countdown to shut-down may be provided, optionally in the form of a timer with, in some embodiments, a slow flash on the warning light, indicating the engine is preparing to shut down. In some embodiments, the alert for imminent engine inaction or shutdown may be a siren or other alarm sound.

The system is configured to determine if automatic engine stop conditions are met. These conditions include engine speed below idle set point, transmission state at neutral/brake/park, battery voltage above minimum, coolant temperature above minimum, transmission temperature above minimum, capacitor charge above minimum amongst other conditions.

When the minimum shutdown conditions are met, the system stops the engine. Optionally a warning or alert is provided prior to shut down to allow for a shutdown abort. In some embodiments, when the minimal shutdown conditions are met, a warning timer starts, initiates a fast flash on the warning light and sounds an alarm. The warning timer may be defined by the user or the system.

In certain embodiments, the starter system is energized while the engine is inactive if the starter system temperature reaches the set point while inactive. Optionally, a warning light or other signal (e.g. visual or sound) may be provided to indicate that the starter is energized and that the engine can start at any time.

In some embodiments, to inhibit an auto-shutdown, an operator can turn the system to manual at the unit, or select neutral (from any location that is possible) thereby returning the unit to an active.

In certain embodiments, the system allows for a normal engine shutdown to be completed from any state.

The system, following the engine shut-down (e.g. automatic engine shut-down), monitors for automatic engine restart conditions including minimum battery voltage; minimum coolant temperature; minimum transmission temperature; and minimum capacitor charge. If automatic engine restart conditions are met, engine restart can be initiated, for example in response to a system signal associated with an instruction for the engine restart. Optionally, a warning is provided to indicate restart is imminent. The warning may be pre-defined by the user or automatically generated by the system. Start-up may include pre-lubrication.

In addition to or alternatively to the automatic engine restart (e.g. the engine is automatically restarted in response to a system signal associated with an instruction for the engine restart), the user can request a start (or restart) of the engine by selecting neutral (from any location that is possible), optionally a warning of imminent start is provided. The warning may be pre-defined by the user or automatically generated by the system. Start-up may include pre-lubrication. A manual start may also be provided.

If the user requests a restart and the energy accumulator is already charged, a user defined or a system-generated warning timer starts, thus providing alerts indicative of the restart (e.g. initiates a fast flash on the warning light and sounds the horn or both). Pre-lube is initiated to provide the oil pressure required for cranking as the warning timer expires. When the timer expires and the desired level of oil pressure is achieved, the system will energize the starter, and further proceed to cranking and starting the engine.

If the accumulator is not charged and the user would like to restart the engine, the operator can request an accumulator charge. The system will check if the fluid is warm enough to work and, if the fluid is warm enough, begin charging the accumulator. If the fluid is not warm enough, the system will heat the fluid first. The warmed fluid (e.g. oil or other feasible liquid) may be used to raise the temperature of the engine or other components of the system, such as but not necessarily limited to the transmission.

Once the accumulator is charged, the user can request an engine restart. A user defined or a system-generated warning timer starts, thus providing alerts for the engine restart (e.g. initiates a fast flash on the warning light and sounds the horn or both). Pre-lube is initiated to provide the oil pressure required for cranking as the warning timer expires. When the timer expires and the desired level of oil pressure is achieved, the system will energize the starter, and further proceed to cranking and starting the engine.

If the accumulator is charged, the user can manually request, or the system can automatically initiate, an energy discharge (e.g. electrical discharge). This is done to minimize the amount of stored energy, for example for safety purposes. It is recommended to be done, for example, before mobilization and/or before any service that requires accessing the mechanical enclosure or disconnecting any electrical lines associated with the idle reduction system.

In some embodiments, the engine will exit the stop the inactive state timer (or exit the inactive state); returning to the normal/active engine condition and reset the timer if engine speed increases above idle or if the transmission is shifted from park.

FIG. 1 illustrates a high-level electrical layout of the components of the idle reduction system 100, according to an embodiment of the present invention. The idle reduction system 100 comprises starter 110, start relay 115, capacitor 120, prelube module 130, programmable logic controller (PLC) 140, chassis battery 150 and alternator 160. In some embodiments, there is more than one starter 110 in the idle reduction system 100. Starter 110b and its corresponding relay 115b are accordingly optional. Each starter 110, 110b is operatively connected to the capacitor 120 through its respective start relay 115, 115b. The capacitor 120 is operatively connected to the PLC 140. The prelube module 130 is also operatively connected to the chassis battery 150. The chassis battery 150 is operatively connected to the alternator 160.

In some embodiments, the start relay 115 may at least in part control the operation of the starter 110.

According to embodiments, the PLC 140 stores one or more data, program instructions and various functions within its programmable memory. The one or more data, program instructions and various functions may be indicative of or operatively associated with one or more of direct current (DC) in, DC out, (engine) start, error and ready. In some embodiments, the PLC 140 provides the one or more program instructions and various functions to other components in the system 100 (e.g. starter 110) in the form of electric signal. By providing the instructions and functions, the PLC 140 may control, manage or support operation of the engine operatively associated with the starter 110. For example, the PLC 140 may provide instructions to inactivate, stop or start the engine. The PLC 140 is operatively connected to the chassis battery 150. The PLC can also include inputs for determining status of various system components, such as capacitor or battery charge levels, equipment on/off states, component or fluid temperatures, user inputs, etc.

To gain a better understanding of the invention described herein, the following examples are set forth. It will be understood that these examples are intended to describe illustrative embodiments of the invention and are not intended to limit the scope of the invention in any way.

Example

Figure 2:
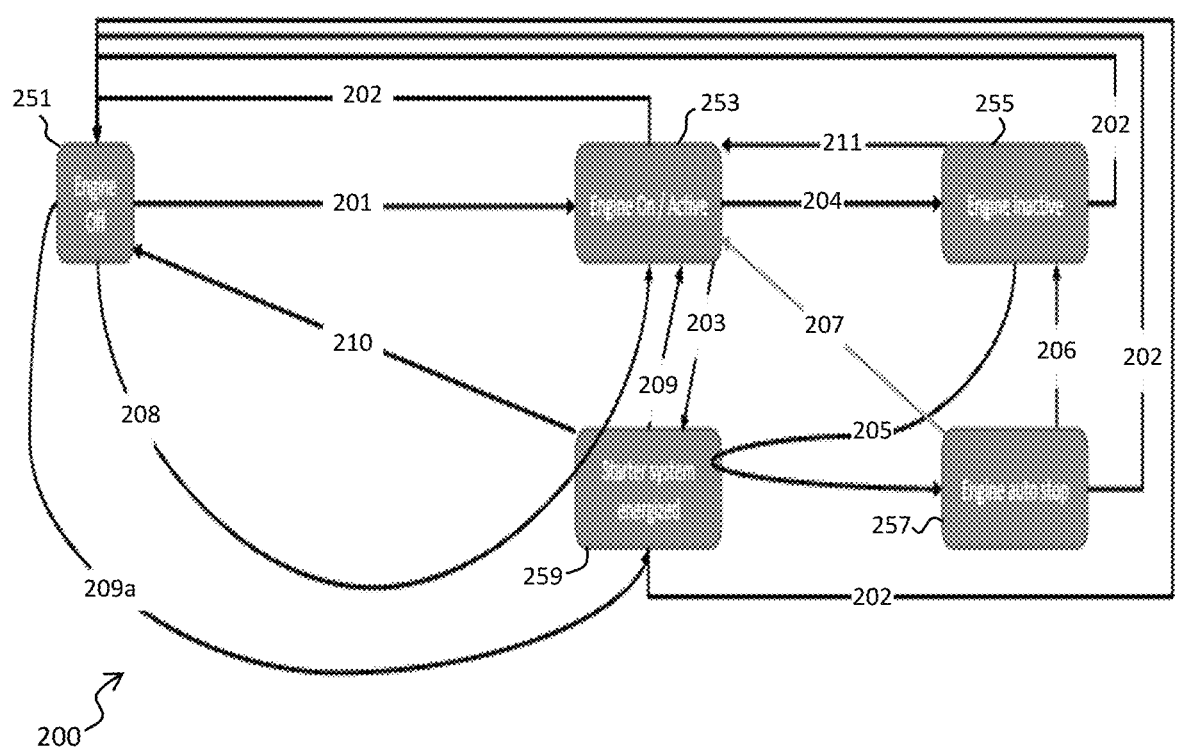
FIG. 2 illustrates a state diagram of an idle reduction system, according to an embodiment of the present invention.

FIG. 2 illustrates a state diagram 200 of an idle reduction system, according to an embodiment of the present invention. Five different states, i.e. Engine Off 251, Engine On/Active 253, Engine Inactive 255, Engine Auto Stop 257 and Starter System Energized 259 are shown, along with transitions between the states.

Transition (201) represents a normal start sequence and transition (202) (i.e. Engine On/Active 253 to Engine Off 251) represents a normal engine shut down sequence. The shutdown sequence can be performed from each of the other states upon predetermined conditions being met. According to transition (203), when the engine is running the system will begin charging the starter accumulator (e.g. supercapacitor). Thus transition (203) occurs over time according to the charging rate of the accumulator. As supercapacitors charge quickly, the transition (203) may be shorter than if the accumulator were solely comprised of chemical batteries or if the accumulator were hydraulic accumulator. In other words, use of supercapacitor may allow the shorter transition (203).

Transition (204) represents engine inactivation after a pre-determined period (e.g. user-defined, system-calculated) at idle and the associated transmission is in a non-driving state such as park. That is, the engine is automatically determined to be inactive after a predetermined idle period, unless prevented from doing so. The engine inactive timer may start in transition (204). In some embodiments, the predetermined idle period is user-adjustable. In some embodiments, the predetermined idle period is automatically adjusted by the system.

Transition (205) occurs when the engine inactive timer reaches zero, the "Automatic Engine Stop Conditions" are met, and the starter system is energized. In this case (i.e. upon transition 205) the system (automatically) stops the engine. The "Automatic Engine Stop Conditions" may include one or more of: engine speed below idle set point, transmission state at brake/park, battery voltage above minimum, coolant temperature above minimum, transmission temperature above minimum, capacitor charge above minimum amongst other conditions.

Transition (206) occurs when the system is in the Auto stop condition (i.e. Engine Auto Stop state 257; the engine has been stopped or completely turned off) The system begins checking the "Automatic Engine Restart Conditions." The "Automatic Engine Restart Conditions" may be associated with one or more of: minimum battery voltage, minimum coolant temperature, minimum transmission temperature, and minimum capacitor charge. When the "Automatic Engine Restart Conditions" are met, the engine restarts using energy stored in an energy accumulator (e.g. electrical accumulator comprising supercapacitor(s)) and the system enters the Engine Inactive state 255. Transition (206) may be triggered by a system signal. The system signal may be generated by the engine idle reduction system (e.g. control system or other component) and may carry one or more instructions associated with the engine restart. The system signal may be an electrical signal.

Transition (207) occurs upon a user requested start, for example by selecting neutral (from any location that is possible). Alternatively, Transition (207) occurs in response to a system signal. The system signal may be generated by the engine idle reduction system (e.g. control system or other component) and may carry one or more instructions associated with the engine restart. The system signal may be an electrical signal.

Transition (208) occurs if the user requests a start and the energy accumulator (e.g. electrical accumulator comprising supercapacitor(s)) is already charged. In this case, the starter system is energized and the engine starts. Transition (209a) occurs if the accumulator is not charged and an engine start is desired. In this case, the operator can request the accumulator charge be charged, for example by a secondary or backup system. Transition (209) subsequently occurs once the accumulator is charged, in order to start the engine. This may occur automatically by the system or when the user requests a start. Transition (210) occurs if the accumulator is charged and the user requests energy discharge (e.g. electrical discharge). Transition (211) causes the engine to return to the normal/active engine condition 253 from the engine inactive condition 255, for example upon a user request or system signals. The system signal may be generated by the engine idle reduction system (e.g. control system or other component) and may carry one or more instructions associated with the engine activation. The system signal may be an electrical signal.

It should be understood that the state diagram 200 as described above is an example only. As mentioned above, embodiments of the present invention pertain to the state diagram in that a supercapacitor is employed as an electrical energy accumulator. This allows the energy accumulator to be charged quickly (e.g. shorter time for transition 203), reducing rate limitations in the state diagram. This also allows for more reliable operation and state transitions, as the supercapacitor is more robust to wear and environmental variations.

Figure 3:
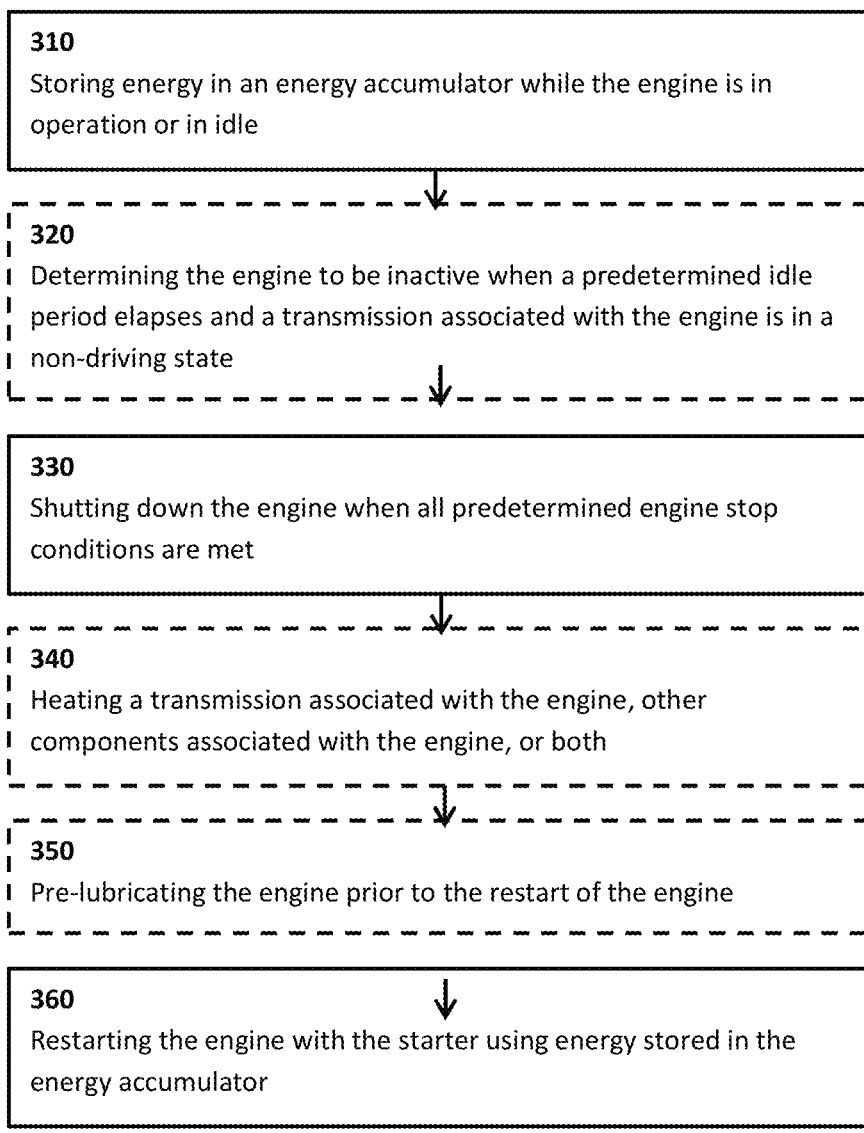
FIG. 3 illustrates a method for operating equipment powered by a fuel-driven engine, in accordance with embodiments of the present invention.

FIG. 3 illustrates a method 300 for operating equipment powered by a fuel-driven engine, in accordance with embodiments of the present invention. The method includes storing 310 energy in an energy accumulator while the engine is in operation or in idle. The energy accumulator is operatively associated with the engine and a starter. In various embodiments, the energy accumulator includes a supercapacitor. In some embodiments, the method 300 further includes determining 320 that the engine is inactive when a predetermined idle period elapses and a transmission associated with the engine is in a non-driving state, such as neutral or park. The predetermined idle period may be user-adjustable via a user interface or automatically adjusted by the system (e.g. engine idle reduction system).

According to embodiments, the method 300 also includes shutting down 330 the engine when all predetermined engine stop conditions are met.

In some embodiments, the method 300 further includes heating 330 a transmission associated with the engine, one or more components associated with the engine, or both, at least when the engine is shut down. The transmission may be heated by directly or indirectly heating a transmission fluid associated with the transmission. Said one or more components may be heated using energy from the supercapacitor. In addition or alternatively, the one or more components may be heated by directly or indirectly heating one or more fluids used in operation of said one or more components. In some embodiments, the heat within the transmission and/or the heat within the one or more components may be preserved through use of insulation or covers.

In some embodiments, the method 300 further includes pre-lubricating 350 the engine prior to the restart of the engine. The engine may be pre-lubricated by circulating engine oil or other fluid. The engine pre-lubrication can provide oil pressure required for cranking According to embodiments, the method 300 further includes restarting 360 engine with the starter using energy stored in the energy accumulator. The engine is restarted in response to an engine restart request or a system signal, when all engine restart conditions are met. The system signal may be the signal generated by the engine idle reduction system (e.g. control system or other component) and may carry one or more instructions associated with the engine restart. The system signal may be an electrical signal.

Figure 4:
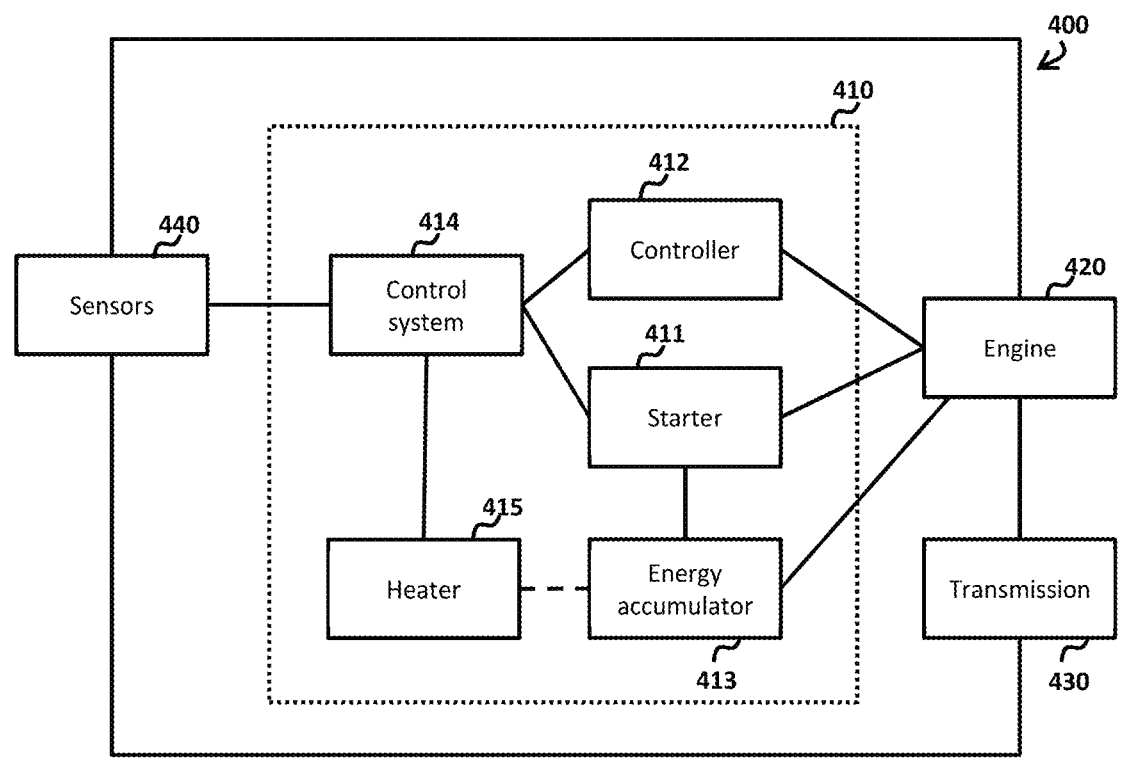
FIG. 4 illustrates equipment powered by a fuel-driven engine, in accordance with embodiments of the present invention.

FIG. 4 is a schematic diagram of equipment 400 powered by a fuel-driven engine that may perform any or all of the steps of the above methods and features described herein, according to different embodiments of the present invention. For example, hydraulic pumping equipment, construction equipment, mining equipment, power generation equipment, and temporary and permanent installation equipment can be configured as such equipment.

As shown, the equipment 400 includes the engine idle reduction system 410, engine 420, transmission 430 and sensors 440. All of these components are operatively connected as illustrated in FIG. 4. According to certain embodiments, any or all of the depicted elements may be utilized, or only a subset of the elements. Further, the equipment 400 may contain multiple instances of certain elements, such as multiple engines, transmissions or sensors.

The engine idle reduction system 410 includes starter 411, engine controller 412, energy accumulator 413, control system 414, heater 415. According to certain embodiments, any or all of starter 411, engine controller 412, energy accumulator 413, control system 414, heater 415 may be utilized, or only a subset of them is utilized. Further, the system 410 may contain multiple instances of certain elements, such as multiple starters, energy accumulators or heaters. The starter 411 is configured to start or restart the engine 420. The engine controller 412 is configured to inactivate or shut down the engine 420. Each of the starter 411 and the engine controller 412 operatively connected to the engine 420. The energy accumulator 413 includes at least one supercapacitor. The energy accumulator 413, in particular the supercapacitor thereof, is configured to store energy, when the engine 420 is in operation or in idle. The energy accumulator 413 provides the stored energy to the starter 411 when the starter 411 attempts to restart the engine 420. For that, the energy accumulator 413 is operatively connected to the starter 411. In some embodiments, the energy accumulator 413 is operatively and directly connected to the engine 420. While FIG. 4 illustrates direct connection, the energy accumulator 413 can be indirectly connected to the engine 420 via the starter 411. The control system 414 is configured to control shutdown and restart of the engine 420. The engine restart and shutdown control may be performed via the starter 411 and the engine controller 412. For the control, the control system 414 is operatively connected to each of the starter 411 and the engine controller 412. The control system 414 includes a processing unit configured to provide, to the starter or the engine controller, one or more instructions. The one or more instructions are associated with (i) shutting down the engine 420 when all engine stop conditions are met, and (ii) restarting the engine 420 with the starter 411 in response to an engine restart request or a system signal, when all engine restart conditions are met.

The heater 415 is operatively connected to the energy accumulator 413 and the control system 414. The heater 415 is configured to heat the transmission 430 and/or other auxiliary equipment (not shown in FIG. 4). In certain embodiments, the heater 415 functions under control of or in collaboration with the control system 414. In certain embodiments, the heater 415 heats one or more transmission fluid, engine coolant or other fluid, and the warmed transmission fluid, engine coolant or other fluid is directed to (or circulated through) the transmission 430 or other auxiliary equipment, thereby heating the transmission 430 or other auxiliary equipment. The fluid(s) can be heated in a variety of ways, for example by directly passing the fluid(s) through the heater 415, or indirectly by heating another fluid and transferring the heat between fluids using a heat exchanger. The power needed by the heater 415 for example to heat various fluids may be provided by a shared or dedicated heat or energy, such as batteries or a diesel fired heater, or possibly at least partially by the energy accumulator 413. According to embodiments, the transmission 430, transmission fluid, or other auxiliary equipment may be heated to prolong time between engine restarts.

The engine 420 may be an internal combustion engine driven using fuel (e.g. combustible fuel) such as but not necessarily limited to gasoline, diesel fuel, bio-diesel, ethanol, or natural gas. The transmission 430 is closely associated with operation of the engine, for example engine restart or engine shut down. Accordingly, the transmission 430 is operatively connected to the engine 420. In certain embodiments, the transmission 430 is heated for example using transmission fluid or other liquid, to enhance operation of the engine 420.

The sensors 440 are configured to monitor or detect various elements, for example engine speed, engine temperature, temperature of auxiliary equipment, transmission temperature, engine coolant, engine oil pressure, associated battery voltage and associated capacitor charge. For that, the sensors 440 are operatively connected to each of the engine 420 and the transmission 430. In certain embodiments, the sensors 440 are part of the engine 420 and/or the transmission 430. The control system 414 may perform the engine restart and shutdown operations based on information or data collected by the sensors 440. For that, the sensors 440 are operatively connected to the control system 414.

Embodiments of the present invention pertain to the state diagram of FIG. 2 in that the transmission or transmission fluid is heated. This allows the time between engine restarts to be extended. As such, the automatic engine restart conditions (transition 206) can be relaxed so that restarts are not necessarily as close together. In other words, embodiments of the present invention include heating at least a transmission system associated with the engine by heating a transmission fluid which is a working fluid within the transmission system. The transmission fluid can be heated by an external heating device. The heated transmission fluid can be circulated through the transmission system for example using a pump. As mentioned above, such heating can serve to heat the engine. This can allow the engine to be shut down for longer periods without having the engine cool below a threshold level that would prompt a restart.

In accordance with an aspect of the invention, there is provided a method for reducing idle time of equipment powered by a fuel-driven engine. The method includes, while the engine is in operation, charging an energy accumulator operatively associated with the engine and a starter. The energy accumulator may be an electrical accumulator and include a battery and/or a supercapacitor. In some embodiments, the electrical accumulator includes at least a supercapacitor. The method further includes detecting at least one operating parameter of the engine and/or the equipment powered by the engine while the engine and/or the equipment powered by the engine is in operation. The method further includes comparing the at least one operating parameter to a predetermined idle reduction parameter or set point to determine if the engine should be shut down. The method further includes shutting down the engine when idle reduction parameter or set point is met; and optionally restarting engine with the starter. The restart may be performed in response to start up request. In some cases, the restart may be performed, for example automatically, in response to the detection of certain operating parameters. In some cases, the restart may be triggered upon comparison of certain operating parameters.

In accordance with another aspect of the invention, there is provided a method for reducing idle time of equipment powered by a fuel-driven engine. The method includes detecting at least one operating parameter of the engine and/or the equipment powered by the engine, while the engine and/or the equipment powered by the engine is in operation. The method further includes comparing the at least one operating parameter to a predetermined idle reduction parameter or set point to determine if the engine should be shut down. The method further includes shutting down the engine when the idle reduction parameter or set point is met; and optionally restarting the engine in response to a start-up request. In accordance with some embodiments of the method, during operation of the engine, the method further includes charging an electrical accumulator and the restarting of the engine is powered by the electrical accumulator.

In accordance with another aspect of the invention, there is provided a method for reducing idle time of equipment powered by a fuel-driven engine. The method includes detecting at least one operating parameter of the engine and/or the equipment powered by the engine. The method further includes comparing the at least one operating parameter to a predetermined idle reduction parameter or set point to determine if operation of the engine should be modified; and optionally modifying operation of the engine and/or associated equipment.

In accordance with another aspect of the invention, there is provided a method for reducing idle time of a hydraulic pumping system powered by a fuel-driven engine. The method includes charging an electrical accumulator while in operation. The method also includes detecting at least one operating parameter of the engine and/or the hydraulic pumping system, while in operation. The method further includes comparing the at least one operating parameter to a predetermined idle reduction parameter or set point in order to determine if the engine should be shut down. The method further includes shutting down the engine when idle reduction parameter or set point is met; and optionally restarting the engine in response to a start-up request. In some embodiments where the engine is restarted in response to a start-up request, the restarting of the engine is powered by the electrical accumulator.

In some embodiments of the above method, the at least one operating parameter is associated with engine speed, engine temperature, temperature of auxiliary equipment, transmission temperature, engine coolant, engine oil pressure, associated battery voltage and associated capacitor charge.

In accordance with another aspect of the invention, there is provided a system for reducing idle time of equipment powered by a fuel-driven engine. The system for reducing idle time includes a control system configured to receive at least one operating parameter of the engine and/or the equipment powered by the engine while the engine and/or the equipment powered by the engine is in operation. The control system is also configured to compare the at least one operating parameter to a predetermined idle reduction parameter or set point in order to determine if the engine should be shut down or re-started. The system for reducing idle time also includes a means for shutting down the engine when idle reduction parameter or set point is met. The system for reducing idle time further includes an electrical accumulator configured to be charged when the engine is operational and a starter operatively associated with the engine and electrical accumulator. In various embodiments, the electrical accumulator powers the starter to re-start the engine.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for operating equipment powered by a fuel-driven engine, the method comprising, using a control system comprising a processing unit, providing the equipment with instructions for:
    while the engine is in operation or in idle, storing energy in each of two or more energy accumulators, each of the two or more energy accumulators operatively associated with the engine and a respective starter of two or more starters, each of the energy accumulators comprising a different respective one of a plurality of supercapacitors;
    shutting down the engine when at least one predetermined engine stop condition is met;
    restarting the engine with at least one of the two or more starters using energy stored in an associated at least one of the energy accumulators in response to an engine restart request or a system signal associated with the restart of the engine, when at least one engine restart condition is met; and
    heating, using electrical power from at least one of the plurality of supercapacitors when the engine is shut down, at least one of the following: a transmission operatively coupled to the engine, including directly or indirectly heating a transmission fluid of the transmission; and at least one component of the engine, including directly or indirectly heating at least one fluid used in operation of said at least one component;
    wherein the equipment is stationary, and the at least one predetermined engine stop condition includes that an operational state of the transmission is a non-driving state, and
    wherein the at least one predetermined engine stop condition and the at least one engine restart condition are further associated with at least one of the following: speed of the engine, temperature of the engine, temperature of auxiliary equipment operatively coupled to the engine, temperature of the transmission, temperature of an engine coolant for the engine, pressure of engine oil for the engine, voltage of a battery forming part of one or more of the energy accumulators, and charge of one or more of the plurality of supercapacitors.

2. The method of claim 1, wherein heat within the transmission, heat within said at least one component, or both are preserved through use of insulation or covers.

3. The method of claim 1, further comprising, prior to the restart of the engine, pre-lubricating the engine by circulating engine oil or other fluid thereby providing oil pressure required for cranking.

4. The method of claim 1, wherein parameters associated with the at least one predetermined engine stop condition and the at least one engine restart condition are adjustable.

5. The method of claim 1, further comprising determining that the engine is inactive when a predetermined idle period elapses and the transmission is in the non-driving state, and wherein the predetermined stop conditions include the engine being inactive.

6. The method of claim 1, wherein at least one of the energy accumulators further comprises at least one additional supercapacitor, electrostatic double-layer capacitor (EDLC), electrochemical pseudo-capacitor, hybrid capacitor, battery, or any combination thereof.

7. The method of claim 1, wherein the equipment powered by the fuel-driven engine is one of hydraulic pumping equipment, construction equipment, mining equipment, and temporary or permanent installation equipment.

8. The method of claim 1, wherein the at least one engine restart condition is associated with the operational state of the transmission being the operational state indicative of whether or not the transmission is in the driving state.

9. A system for reducing idle time of equipment powered by a fuel-driven engine, the system comprising:
two or more starters each configured to restart the engine;
an engine controller configured to inactivate and shut down the engine;
two or more energy accumulators each comprising a different respective one of a plurality of supercapacitors, each of the plurality of supercapacitors configured to store energy when the engine is in operation or in idle and provide the stored energy to a different respective one of the two or more starters when said one of the two or more starter restarts the engine, each of the two or more energy accumulators operatively associated with the engine and one of the two or more starters; and
a control system for controlling shutdown and restart of the engine comprising a processing unit configured to provide, to the starter or the engine controller, instructions for:
shutting down the engine when at least one predetermined engine stop condition is met,
restarting the engine with at least one of the two or more starters in response to an engine restart request or a system signal associated with the restart of the engine, when at least one engine restart condition is met; and
heating, using electrical power from at least one of the plurality of supercapacitors when the engine is shut down, at least one of the following: a transmission operatively coupled to the engine, including directly or indirectly heating a transmission fluid of the transmission; and at least one component of the engine, including directly or indirectly heating at least one fluid used in operation of said at least one component;
wherein the equipment is stationary, and the at least one predetermined engine stop condition includes that an operational state of the transmission is a non-driving state, and
wherein the at least one predetermined engine stop condition and the at least one engine restart condition are further associated with at least one of the following: speed of the engine, temperature of the engine, temperature of auxiliary equipment operatively coupled to the engine, temperature of the transmission, temperature of an engine coolant for the engine, pressure of engine oil for the engine, voltage of a battery forming part of one or more of the energy accumulators, and charge of one or more of the plurality of supercapacitors.

10. The system of claim 9, wherein heat within the transmission, heat within said at least one component, or both are preserved through use of insulation or covers.

11. The system of claim 9, wherein parameters associated with the at least one predetermined engine stop condition and the at least one engine restart condition are user-adjustable.

12. The system of claim 9, wherein the instructions further include determining that the engine is inactive when a predetermined idle period elapses and the transmission is in the non-driving state, and wherein the predetermined stop conditions include the engine being inactive.

13. The system of claim 9, wherein at least one of the energy accumulators further comprises at least one additional supercapacitor, electrostatic double-layer capacitor (EDLC), electrochemical pseudo-capacitor, hybrid capacitor, battery, or any combination thereof.

14. The system of claim 9, wherein the equipment powered by the fuel-driven engine is one of hydraulic pumping equipment, construction equipment, mining equipment, power generation equipment, and temporary or permanent installation equipment.

15. The method of claim 1, wherein the at least one predetermined engine stop condition and the at least one engine restart condition are associated with at least one of the following: said temperature of auxiliary equipment operatively coupled to the engine, said temperature of the transmission, and said pressure of engine oil.

16. The system of claim 9, wherein the at least one engine restart condition is associated with the operational state of the transmission being the operational state indicative of whether or not the transmission is in the driving state.

* * * * *